United States Patent [19]

Blecksmith et al.

[11] Patent Number: 5,719,988
[45] Date of Patent: Feb. 17, 1998

[54] DYNAMICALLY PAGED NON-VOLATILE RANDOM ACCESS VIDEO STORE

[75] Inventors: James E. Blecksmith, Nevada City; David Casper, Oregon House; James A. Delwiche; Brion L. Dunbar, both of Grass Valley; Thomas H. Knight, Nevada City; Scott Murray, Nevada City; Neil R. Olmstead, Nevada City, all of Calif.

[73] Assignee: Tektronix, Inc., Wilsonville, Oreg.

[21] Appl. No.: 604,267

[22] Filed: Feb. 21, 1996

Related U.S. Application Data

[63] Continuation of Ser. No. 251,448, May 31, 1994, abandoned.

[51] Int. Cl.$^6$ .................................................. G06F 13/00
[52] U.S. Cl. ........................... 386/121; 395/841; 395/894
[58] Field of Search ........................ 360/35.1, 39; 348/18, 348/22; 395/489, 841, 894; 386/117, 118, 121

[56] References Cited

U.S. PATENT DOCUMENTS

| | | | |
|---|---|---|---|
| 4,694,357 | 9/1987 | Rahman et al. | 360/35.1 X |
| 4,755,889 | 7/1988 | Schwartz | 360/32 |
| 4,802,008 | 1/1989 | Walling | 348/18 X |
| 5,179,683 | 1/1993 | Murakami et al. | 395/841 |
| 5,200,863 | 4/1993 | Orii | 360/35.1 |
| 5,353,410 | 10/1994 | Macon, Jr. et al. | 395/894 X |
| 5,353,430 | 10/1994 | Lautzenheiser | 395/894 X |
| 5,355,353 | 10/1994 | Kaiho | 369/13 |
| 5,463,422 | 10/1995 | Simpson et al. | 348/390 |
| 5,475,539 | 12/1995 | Orii | 386/118 |

*Primary Examiner*—Aristotelis M. Psitos
*Assistant Examiner*—James L. Habermehl
*Attorney, Agent, or Firm*—Francis I. Gray

[57] ABSTRACT

A dynamically paged non-volatile random access video store has a random access memory integrated with a disk drive. The random access memory provides realtime access for recording and playing back video from and to a video source. The disk drive provides a non-volatile backup for the random access memory by transferring data between the disk drive and random access memory automatically, or by command, on a non-realtime basis. The video data accesses and transfers are handled by a microprocessor that interfaces with a controller by which an operator inputs instructions. Multiple channels are accommodated via a channel interface, also controlled by the microprocessor, between external video devices and the random access memory. The disk drive stores a plurality of pages of video data, each page corresponding to the capacity of the random access memory.

6 Claims, 1 Drawing Sheet

DYNAMICALLY PAGED NON-VOLATILE RANDOM ACCESS VIDEO STORE

This is a continuation of application Ser. No. 08/251,448, filed May 31, 1994 and now abandoned.

BACKGROUND OF THE INVENTION

The present invention relates to video storage devices, and more particularly to a dynamically paged non-volatile random access video store to provide true random, multi-channel read and write access with non-volatile retention.

There are three fundamental media used to store video. The first medium is traditional magnetic tape, such as used in a composite digital (D2) tape machine. The second medium is magnetic disk drives, and the third is random access memory (RAM). Several factors affect the medium choice, among which are the cost per second of storage, the access time to retrieve a random field, the long-term retention capability and overall bandwidth. Each medium has specific strengths and weaknesses in these areas. For example while RAM has excellent retrieval latency and high bandwidth, it is very expensive (high cost per second) and has poor retention (generally all data is lost when power is removed). Disk drives have excellent retention, fairly good access time, moderate cost, but low bandwidth.

What is desirable is a video storage medium that combines the benefits of both RAM and disk drive video storage devices.

SUMMARY OF THE INVENTION

Accordingly the present invention provides a dynamically paged non-volatile random access video store that has true random, multi-channel read and write access with non-volatile retention. A random access memory (RAM) is integrated with a disk drive, with the RAM interfacing with external video sources for record/playback on a realtime basis. The disk drive acts as a non-volatile backup for the RAM, and data transfers occur between the RAM and disk drive on a non-realtime basis. The disk drive has a capacity equal to many times that of the RAM, and is divided into pages, with each page being equivalent to the capacity of the RAM.

The objects, advantages and other novel features of the present invention are apparent from the following detailed description when read in conjunction with the appended claims and attached drawing.

BRIEF DESCRIPTION OF THE DRAWINGS

FIGS. 2A and 2B are block diagram views illustrating operation of a dynamically paged non-volatile random access video store according to the present invention.

DESCRIPTION OF THE PREFERRED EMBODIMENT

Figure 1:
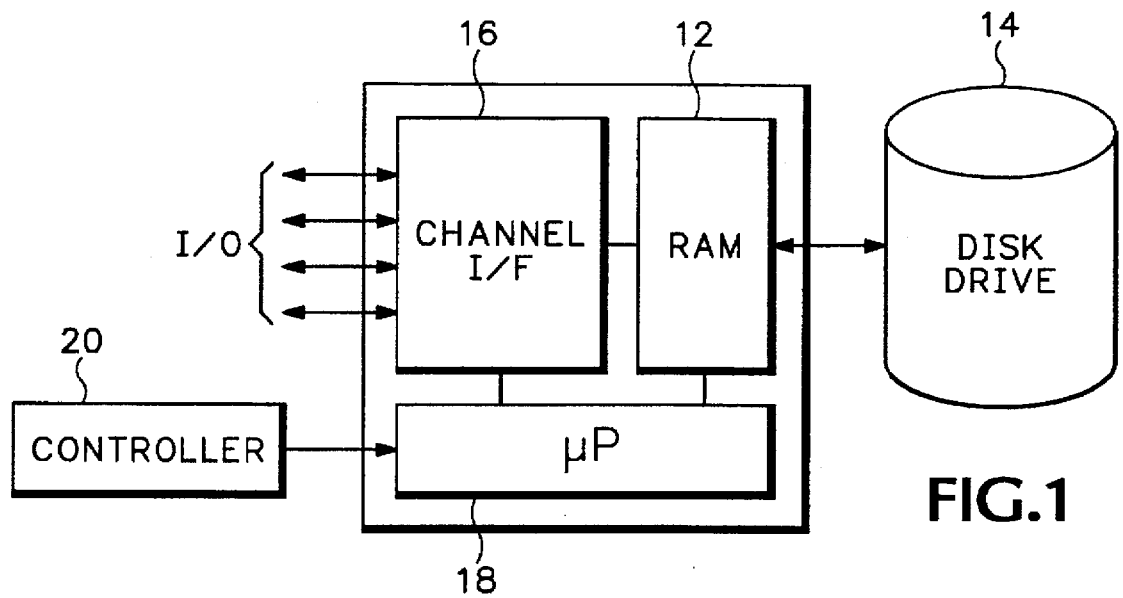
FIG. 1 is a block diagram view of a dynamically paged non-volatile random access video store according to the present invention.

Referring now to FIG. 1 a random access memory (RAM) 12 is used as the primary storage medium to play and record (read and write) video frames in real time to and from an external video device. The storage may be partitioned for video only or video plus key. A user may play from one section of the RAM 12 while simultaneously recording into another section of the RAM. A disk drive 14 is coupled to the RAM 12 to backup all video frames stored in the RAM. The backup transfer between the RAM 12 and the disk drive 14 occurs in the background, transparently to the user, on a non-realtime basis. At power up the RAM 12 is automatically refreshed from the disk drive 14. Thus this integrated backup provides non-volatility for the RAM 12.

The disk drive 14 is capable of storing many copies of the entire RAM 12, typically 10–20 complete copies. By denoting each copy as a "page", it is possible for the user to request any one of the Pages to be brought into the RAM 12 from the disk drive 14. The RAM Page may be sub-divided into smaller clips which are correlated with their non-volatile copies on the disk drive 14. Once a Page is available in the RAM 12 realtime read access may occur on this Page with zero latency to any field/frame. Any time video is recorded into the RAM 12 it is automatically copied onto the appropriate Page of storage area on the disk drive 14, thus providing a permanent copy of the modified Page.

A channel interface 16 provides video access with the external video devices to/from the RAM 12 for multi-channel operation. A microprocessor 18 is used to provide control for the RAM 12 and the channel interface 16. An external controller 20 provides appropriate instructions to the microprocessor 18 from an operator.

The high bandwidth of the RAM 12 provides the ability for multiple input and output channels, each having access to any section of the Page in the RAM. The amount of storage is only limited by the amount of money one is willing to spend on the RAM 12 and the physical limitations of circuit board size. The number of channels is determined by the hardware design. To store one second of digital composite (D2) video, approximately 14.4 MegaBytes of storage are needed. Other formats, either compressed or uncompressed, require differing amounts. A typical example is to have 20 seconds of storage available in the RAM 12, allowing four channels access to any video frame in real time. Thus for the D2 format 20 seconds of video storage requires 288 MegaBytes in the RAM 12. Additional circuitry allows common video tape recorder (VTR) functions, such as shuttle, freeze and slow motion, as indicated in co-pending U.S. patent application Ser. No. 07/949,174 filed Sep. 21, 1992 by Kevin D. Windrem et al entitled "Disk-Based Digital Video Recorder" incorporated herein by reference. The size of the video Page from the disk drive 14 is determined by the amount of storage in the RAM 12 available to transfer into. Additionally the higher the capacity of the disk drive 14, the more Pages of video that may be stored. For a typical high capacity disk drive 14, such as a 2.5 GigaByte disk drive, approximately 170 seconds of D2 video may be stored.

Figure 2A:
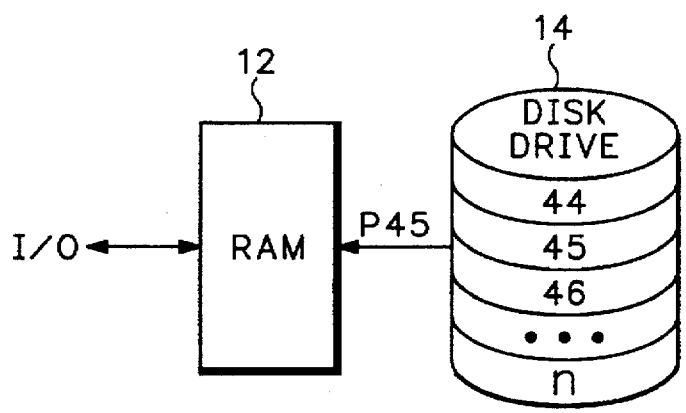
Figure 3A:
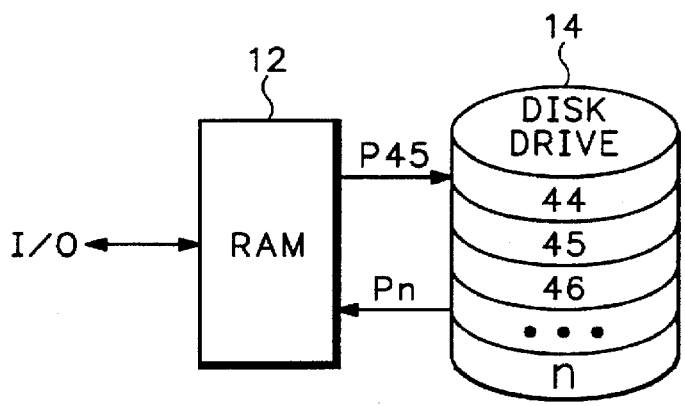

The microprocessor 18 handles the interface to the controller 20, the channel interface 16 and the RAM 12, as well as determining when to read/write the video in the RAM to/from the disk drive 14. If a request that Page 45 be loaded into the RAM 12 is transmitted from the controller 20 to the microprocessor 18, then it is transferred from the disk drive 14 in non-realtime, as shown in FIG. 2A. When modified, Page 45 is re-written to the disk drive 14 automatically under control of the microprocessor 18, or when the user requests a write via the controller 20. If the user now wants Page "n" to be loaded into the RAM 12, then, if Page 45 has been modified, it writes Page 45 back to the disk drive 14 before retrieving Page "n", as shown in FIG. 2B.

Thus the present invention provides a dynamically paged non-volatile random access video store by integrating a disk drive with a random access memory to provide inexpensive non-volatile backup, the disk drive having a capacity of may pages where each page equals the capacity of the RAM, so that video is transferred on a non-realtime basis between the RAM and disk drive in the background, transparent to a user, while video is recorded/played back to/from the RAM in realtime.

What is claimed is:

1. A non-volatile random access video store comprising:

a random access memory as a primary storage medium coupled to record/playback video data from/to a video device, the random access memory having a large capacity to store a plurality of frames of video data representing a plurality of seconds of video data;

a disk drive coupled to the random access memory to provide a non-volatile backup for the random access memory; and means in response to operator commands for writing video data into the random access memory from the video device and for reading video data from the random access memory for the video device on a video realtime basis, and in the background for writing and reading video data between the random access memory and the disk drive on a non-realtime basis, the disk drive providing an initial data source of video data at startup corresponding to the video data contained in the random access memory at shutdown.

2. The video store as recited in claim 1 wherein the disk drive has a capacity sufficient to hold a plurality of pages of video data, each page of video data corresponding to the capacity of the random access memory.

3. The video store as recited in claim 1 wherein the writing and reading means includes means for automatically transferring video data between the random access memory and the disk drive.

4. A method of storing video data in a non-volatile random access video store comprising the steps of:

accessing a random access memory as a primary storage medium on a realtime basis for recording/playing back video data from/to a video device, the random access memory having a large capacity to store a plurality of frames of video data representing a plurality of seconds of video data; and transferring video data between the random access memory and a disk driver on a non-realtime basis to provide a non-volatile backup for the random access memory in the background while writing video data into the random access memory from a video device and reading video data from the random access memory for the video device on a video realtime basis, the disk drive providing video data to the random access memory at startup corresponding to the video data in the random access memory at shutdown.

5. The method as recited in claim 4 wherein the disk drive has a capacity sufficient to hold a plurality of pages of video data, each page of video data corresponding to the capacity of the random access memory.

6. The method as recited in claim 4 wherein the transferring step includes automatically transferring video data between the random access memory and the disk drive.

* * * * *